(12) United States Patent
Hodgkins et al.

(10) Patent No.: US 12,312,244 B2
(45) Date of Patent: May 27, 2025

(54) METHOD FOR MANUFACTURE OF MESOPOROUS SILICA IN THE PRESENCE OF THERMALLY EXPANDABLE MICROCELLS

(71) Applicant: SAUDI ARABIAN OIL COMPANY, Dhahran (SA)

(72) Inventors: Robert Peter Hodgkins, Dhahran (SA); Omer Refa Koseoglu, Dhahran (SA)

(73) Assignee: Saudi Arabian Oil Company, Dharhran (SA)

( * ) Notice: Subject to any disclaimer, the term of this patent is extended or adjusted under 35 U.S.C. 154(b) by 1018 days.

(21) Appl. No.: 17/347,081

(22) Filed: Jun. 14, 2021

(65) Prior Publication Data

US 2022/0396489 A1    Dec. 15, 2022

(51) Int. Cl.
*C01B 33/12*     (2006.01)
*C01B 33/143*    (2006.01)

(52) U.S. Cl.
CPC .......... *C01B 33/128* (2013.01); *C01B 33/143* (2013.01); *C01P 2002/72* (2013.01); *C01P 2002/76* (2013.01); *C01P 2002/86* (2013.01); *C01P 2002/88* (2013.01); *C01P 2004/03* (2013.01)

(58) Field of Classification Search
CPC ............................ C01B 33/128; C01B 33/143
See application file for complete search history.

(56) References Cited

U.S. PATENT DOCUMENTS

| | | | |
|---|---|---|---|
| 3,556,725 | A | 1/1971 | Chiola et al. |
| 5,951,962 | A | 9/1999 | Müller et al. |
| 2019/0169395 | A1 | 6/2019 | Wandera et al. |

FOREIGN PATENT DOCUMENTS

| | | |
|---|---|---|
| CN | 104531067 A | 4/2015 |
| CN | 107596432 A | 1/2018 |
| CN | 104379647 B | 6/2018 |
| CN | 109792075 A | 5/2019 |
| CN | 111498862 A | 8/2020 |
| EP | 831059 B | 12/2001 |
| KR | 834803 B1 | 6/2008 |

OTHER PUBLICATIONS

Office Action in corresponding Saudi Arabian Application No. 122431199, mailed Jan. 30, 2024.
Kruk et al.; Pore Size Tailoring in Large-Pore SBA-15 Silica Synthesized in the Presence of Hexane; Langmuir, May 16, 2007, 23, 7247-7254.
Kresge et al.; "Ordered Mesoporous Molecular Sieves Synthesized by Liquid-Crystal Template Mechanism", Nature, 1992, 359, 710.; 3 pages.
Beck, et al.; "A new family of mesoporous molecular sieves prepared with liquid crystal templates"; J. Am. Chem. Soc., 1992, 114, 10834; 10 pages.

(Continued)

*Primary Examiner* — James A Fiorito
(74) *Attorney, Agent, or Firm* — LEASON ELLIS LLP

(57) ABSTRACT

Methods of synthesis of mesoporous silica are disclosed. The mesoporous silica synthesized herein, like SBA-15, possesses a two-dimensional, hexagonal, through-hole structure with a space group p6mm. An effective quantity of one or more thermally expandable microcells are used during synthesis to impart distinct characteristics.

12 Claims, 4 Drawing Sheets

(56) References Cited

OTHER PUBLICATIONS

Zhao et al.; "Nonionic Triblock And Star Diblock Copolymer and Oligomeric Surfactant Syntheses of Highly Ordered, Hydrothermally Stable, Mesoporous Silica Structures"; J. Am. Chem. Soc. 1998; 120, 6024-6036; 13 pages.

Abdelali Zaki, et al., Tunable hierarchical porous silica materials using hydrothermal sedimentation-aggregation technique, Microporous and Mesoporous Materials, 2015, vol. 208, pp. 140-151.

Nai Ci Bing, et al., Synthesis and characteristic of molecularly imprinted polymer immobilized mesoporous silica sphere for selective binding of S-naproxen, Multi-functional Materials and Structures, 2008, vol. 47, pp. 890-893.

Nouryon, Expandcel DU product specifications, Sep. 2020, 2 pages.

MS-TEMs

Conventional SBA-15

METHOD FOR MANUFACTURE OF MESOPOROUS SILICA IN THE PRESENCE OF THERMALLY EXPANDABLE MICROCELLS

RELATED APPLICATIONS

Not applicable.

BACKGROUND OF THE INVENTION

Field of the Invention

The present invention relates to a method of making mesoporous silica.

Description of Related Art

Zeolites are microporous aluminosilicate materials (pores typically up to 2 nm) that are heavily used in industry as catalysts or catalyst base materials (catalytic cracking of hydrocarbons and as components in catalytic convertors), adsorbents (drying agents) and ion exchange materials (water softening). Whereas zeolites have found great utility in their ability to select between small molecules and different cations, mesoporous solids (pores between 2 nm and 50 nm) offer possibilities for applications for species up to an order of magnitude larger in dimensions such as nanoparticles and enzymes. The comparatively bulky nature of such species hinders diffusion through the microporous zeolite network, and thus, a larger porous system is required to effectively perform an analogous molecular sieving action for the larger species.

The field of mesoporous materials primarily stems from zeolite research undertaken during the 1990s when researchers were pursuing large pore zeolite analogues for heavy hydrocarbon conversion (Ordered mesoporous molecular sieves synthesized by a liquid-crystal template mechanism, C. T. Kresge, M E. Leonowicz, W. J. Roth, J. C. Vartuli and J. S. Beck, Nature, 1992, 359, 710; A new family of mesoporous molecular sieves prepared with liquid crystal templates, J. S. Beck, J. C. Vartuli, W. J. Roth, M. E. Leonowicz, C. T. Kresge, K. D. Schmitt, C. T. W. Chu, D. H Olson E. W. Sheppard, S. B. McCullen, J. B. Higgins and J. L. Schlenker, J. Am. Chem. Soc., 1992, 114, 10834). Since numerous synthetic architectures were crystallized around structure directing agents or templates, which, upon removal, renders the material porous, the rationale was that larger templates or aggregations of molecules could act as a mold. Mesoporous silica was realized in 1992, with MCRA-41 (Mobil Composition of Matter) templated using amphiphilic surfactant aggregations in a sol-gel synthesis, namely using CTAB (cetyltrimethylammonium bromide).

Mesoporous silicas are amorphous; however, it is the pores that possess long-range order with a periodically aligned pore structure and uniform pore sizes on the mesoscale. Mesoporous silicas offer high surface areas and can be used as host materials to introduce additional functionality for a diverse range of applications such as adsorption, separation, catalysis, drug delivery and energy conversion and storage.

"Soft" templates can be used for the synthesis of mesoporous silica, for example CTAB and amphiphilic block copolymers. A common reagent for the latter block copolymer is Pluronic P123 (BASF). The SBA-series (Santa Barbara) of mesoporous silicas (Dongyuan Zhao, Qisheng Huo, Jianglin Feng, Bradley F Chmelka, Galen D Stucky, J. Am. Chem. Soc., 1998, 120, 6024) further opened the field of mesoporous silicas with larger pores by utilizing such block copolymer templates in the syntheses of mesoporous silicas. This "soft" templating approach allows for the mesopore structure, shape and pore size to be designed through controlling the synthesis conditions and the nature of the template used. Pluronic P123 used for production of SBA-15 mesoporous silica is a triblock copolymer of ethylene oxide/propylene oxide/ethylene oxide having the composition $(EO_{20}PO_{70}EO_{20})$.

Surfactants, used as the templates for mesoporous silicas, and deemed amphiphilic molecules, possess a hydrophilic head group and a hydrophobic tail, and can be classified into various types depending on their constituent groups:
  i) cationic whereby the hydrophobic head groups are amine/quaternary ammonium cations as in CTAB,
  ii) anionic constituting for example carboxylic head groups,
  iii) non-ionic having polyether/polyhydroxyl polar groups, or
  iv) zwitterionic containing two charged head groups of opposite charge. The hydrophobic section tends to be long alkyl chains.

At low concentrations surfactants exist as discrete entities. However, at higher concentrations, that is, above the critical micelle concentration (CMC), micelles are formed. The hydrophobic interactions in the system comprising the surfactant can alter the packing shape of the surfactants into spherical, prolate or cylindrical micelles, which can thereafter form thermodynamically stable two dimensional or three dimensional liquid crystalline phases of ordered mesostructures. The surfactant geometry influences the mesophase formed, from cubic to lamellar.

The sol-gel route is typically used to synthesize SBA-15 and involves a two-step process: a hydrolysis step followed by a condensation step.

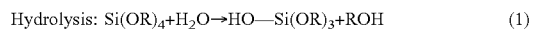

$$\text{Hydrolysis: } Si(OR)_4 + H_2O \rightarrow HO-Si(OR)_3 + ROH \quad (1)$$

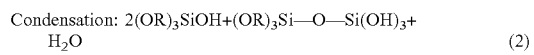

$$\text{Condensation: } 2(OR)_3SiOH + (OR)_3Si-O-Si(OH)_3 + H_2O \quad (2)$$

where R is an alkyl.

Mesoporous silica can be functionalized by post-synthetic grafting of, for example organosiloxanes. First the mesoporous silica need to be rendered porous by removing the surfactant from the pores. This is typically done by calcining the material to leave the porous inorganic silica framework. However, calcining mesoporous silica further condenses the framework to form additional siloxane bridges (a higher degree of $Q^4$ silica). Post synthetic modification by organosiloxane grafting can only occur where there are silanol groups as these act as anchors for the organosiloxane, thus $Q^3$, $Q^2$, $Q^1$ or $Q^0$ silica must be present as $Q^4$ silica are fully condensed to form a rigid framework. Since calcination condenses the framework there is a decreased volume of silanol groups available for organic modification silylation and so that silanol groups have to be replenished if a high surface coverage of functional groups is required. This can be achieved by rehydrating the surface.

Thermally expandable microspheres were developed by Dow Chemicals in 1970 and then improved by AkzoNobel and commercialized in 1980 under the commercial name Expancel. Expancel products consist of polymer shells of acrylonitrile, vinylidene chloride and methylmethacrylate with a hydrocarbon core (isobutane), with a density of 1,000-1,300 kg/m³ in their unexpanded form. At elevated temperatures (95-146° C.) the polymer shell softens and the gas pressure within increases resulting in a dramatic increase in volume. For instance, certain lines of Expancel materials are composed of initial spheres approximately 10 μm in diameter with shell thicknesses of 2 μm. After expansion, the spheres can significantly expand to approximately 40 μm having a shell thickness of 0.1 μm. Hence, expansion can be up to 60 times the original volume.

The Expancel products can be used as a lightweight filler and blowing agent. The Expancel FG products have been adopted in the food packaging industry and offer high compressibility, no shrinkage, no moisture absorption and are approved by regulators. The Expancel WE and DE products are used for elastomeric cool-roof coatings and gives enhanced reflectance and elasticity and reduces cost and weight. The Expancel DU and DE products are used by the automotive industry to reduce weight, dampen sound and improve sealing.

Additionally, other applications where Expancel is used is in the inks and pigments industry in printing ink to create desired effects on textiles, wallpapers and polyester films. In polymer processing, the uniform, closed cell structure of the Expancel microspheres results in a stable, controlled foaming process.

As lightweight fillers, Expancel spheres have been employed in architectural paints to reduce binder requirements. Also, within sealants and adhesives for lighter, durable and more cost-effective sealants and adhesives. They are also used as cool roof coatings to reduce surface temperatures.

Despite the known methods that exist for manufacturing SBA-15 mesoporous silica, there remains a need in the art for improved methods to produce SBA-15 mesoporous silica and modified mesoporous silica materials.

SUMMARY

Methods of synthesis of mesoporous silica are disclosed. The mesoporous silica synthesized herein, like SBA-15, possesses a two-dimensional, hexagonal, through-hole structure with a space group p6mm.

In one embodiment, the method comprises mixing in an acidic aqueous medium under conditions conducive to promote hydrolysis reactions effective quantities of a surfactant as a soft template material to influence a silica mesoporous structure, thermally expandable microcells, and a silica source. The mixture is then heated under conditions and for a time effective conducive to promote condensation reactions and to form mesoporous silica as a precipitate suspended in a supernatant as an intermediate suspension. The mesoporous silica is recovered from the intermediate suspension. In certain embodiments the recovered mesoporous silica is treated to remove surfactant, for example, by thermal treatment to realize calcined mesoporous silica material.

In another embodiment, the method comprises mixing in an acid aqueous medium an effective quantity of a surfactant as a soft template material to influence a silica mesoporous structure to form a first mixture; mixing an effective quantity of thermally expandable microcells with the first mixture to form a second mixture; mixing an effective quantity of a silica source with the second mixture under conditions conducive to promote hydrolysis reactions and form a third mixture; heating the third mixture under conditions and for a time effective conducive to promote condensation reactions and to form mesoporous silica as a precipitate suspended in a supernatant as an intermediate suspension; and recovering the mesoporous silica from the intermediate suspension. In certain embodiments the recovered mesoporous silica is treated to remove surfactant, for example, by thermal treatment to realize calcined mesoporous silica material.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where.

DETAILED DESCRIPTION

Figure 1:
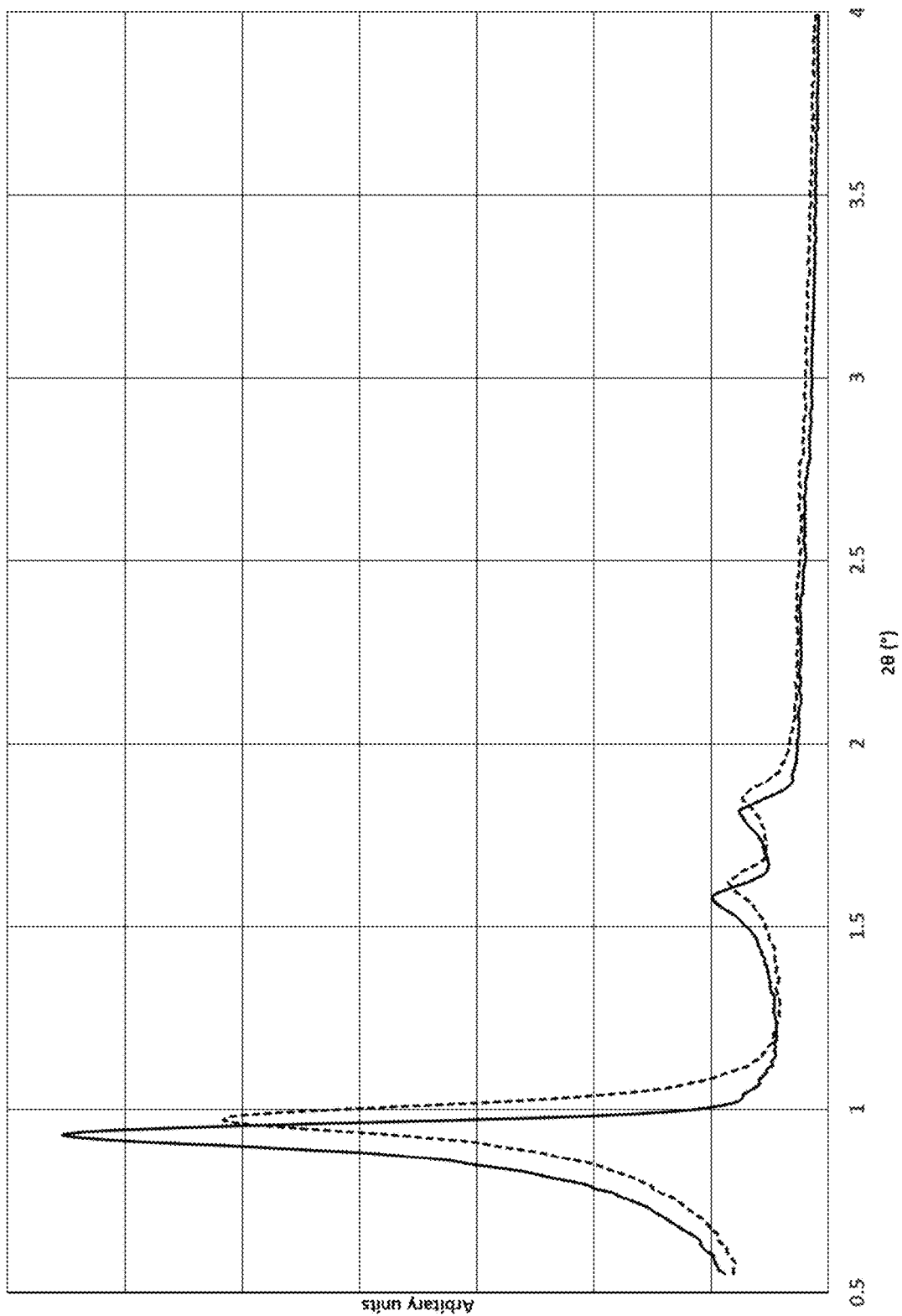
FIG. 1 shows X-ray diffraction patterns of conventional SBA-15 and mesoporous silica synthesized in the presence of thermally expandable microcells (MS-TEMs)

Described herein are methods of manufacture of mesoporous silica having hexagonal p6mm symmetry, similar to SBA-15 mesoporous silicas, and are useful as a catalysts or catalyst base materials. An effective quantity of thermally expandable microcells (TEMs) are used during synthesis, as described herein, to impart distinct characteristics. As used herein, the as-produced mesoporous silica is sometimes referred to as "MS-TEMs." It is understood that this notation shall be applicable for the so-produced mesoporous silica in its condition prior to treatment to remove the surfactant and TEMs, such as thermal treatment or solvent extraction, or in its treated state.

A sol-gel synthesis method comprises mixing, in an aqueous medium, a silica source, a surfactant, an acid and an effective amount of TEMs. The mixture is heated under conditions and for a time effective to form the mesoporous silica as thermodynamically stable two dimensional or three dimensional liquid crystalline phases of ordered mesostructures, as a precipitate suspended in a supernatant. The MS-TEMs is recovered from the intermediate suspension of the precipitate in the supernatant, for example by filtration, washing and drying.

A porous material is obtained by treating recovered precipitate to remove the surfactant and the TEMs, for example by thermal treatment and/or solvent extraction. For example, thermal treatment can include calcination at a suitable temperature, temperature ramp rate and for a suitable period of time at to realize MS-TEMS. Alternatively, a solvent with a Hildebrand solubility factor more than 18, including but not limited to ethanol (Hildebrand solubility factor of 26.2), can be used in a solvent extraction process, which is effective to remove the surfactant and any remaining content from the TEMs. In certain embodiments, a solvent extraction process is suitable to realize an increase in silanol groups when compared with calcination.

The thermally expandable microcells used in the process herein for synthesizing MS-TEMs material are in the form of three-dimensional shaped cells with a shell-core structure. The shape of the cells can be spheres, spheroids, ellipsoids, capsules (cylinders with hemispherical ends), an arbitrary shape, or combinations thereof. In certain embodiments the shapes are commercially available microspheres as described herein, which are spheres or approximate spherical bodies. The cells comprise a low-boiling-point liquid hydrocarbon or oxygen-containing hydrocarbon contained within a thermoplastic shell such as a plastic polymer. At elevated temperatures up to a decomposition temperature, the polymer shells of the TEMs soften and the gas pressure within increases resulting in a dramatic increase in the cell volumes. For example, the volumes of each cell can increase about 5-60, 10-60, 20-60, 30-60, 40-60, 5-50 or 10-50 fold. The diameter of the cells (or average diameter in the case of non-spherical cells), prior to expanding, can be in the range of about 5-40, 10-40, 5-30, 10-30, 5-20, 10-20 micrometers (μm). After expansion, this diameter or average diameter increases about 1.5-5, 2-5, 3-5, 1.5-4, 2-4 or 3-4 fold, for example to a value of about 15-95, 25-95, 30-95, 15-85, 25-85, 30-85, 15-55, 25-55, 30-55, 15-45, 25-45 or 30-45 μm. The shell thickness, prior to expanding, can be in the range of about 1-3, 1-2.5, 1.5-3, 1.5-2.5 or about 2 μm. After expansion, this thickness reduces about 5-30, 10-30, 5-25 or 10-25 fold, for example to a value of about 0.05-0.2, 0.05-0.15, 0.07-0.2, 0.07-0.2 or about 0.1 μm. For spherical or non-spherical cells, the size can also be expressed as starting volumes and maximum volumes (where the volume is an overall volume and includes the shell), where the starting volume can be in the range of about 14-30000, 260-30000, 14-11500, 260-11500, 14-3100 or 260-3100 cubic micrometers (μm$^3$) and the maximum volume can be in the range of about 1100-425000, 6300-425000, 11500-425000, 1100-300000, 6300-300000, 11500-300000, 1100-78000, 6300-78000, 11500-78000, 1100-42000, 6300-42000 or 11500-42000 μm. The shells of the TEMs are formed of materials that possess a characteristic starting expansion temperature or range of temperatures, for example where the temperature or range of temperatures is encompassed by the ranges of about 80-180, 95-180, 80-150, 95-150, 80-120, 95-120 or 95-110° C., and a characteristic maximum expansion temperature or range of temperatures corresponding to decomposition of the shell material, for example where the temperature or range of temperatures is encompassed by the ranges of about 110-240, 120-240, 150-240, 180-240, 110-200, 120-200, 150-200, 180-200, 110-160 or 120-160° C. 1251 The shell of the TEMs used in the process herein for synthesizing MS-TEMs are polymers (including copolymers and/or block copolymers) including a species selected from the group consisting of acrylonitrile, vinylidene chloride, methyl methacrylate and combinations thereof. The core of the TEMs contains low boiling point liquid hydrocarbons (paraffins with carbon number 4-8, for example isobutane, isopentane, 2,2,4-trimethylpentane and combinations thereof) and/or oxygen containing hydrocarbons (ethers) as core material. Thermally expandable microcells that possess the herein mentioned properties are commercially available under various tradenames including but not limited to Expancel® (AkzoNobel N.V.), Advancell EM (Sekisui Chemical Co., Ltd.), Kureha Microsphere (Kureha Corp.), Dualite® (Chase Corp.), or Clocell® (PolyChem Alloy). In the processes herein for synthesizing SBA-15-TEMs mesoporous silica, the TEMs used can be the same or different shapes, dimensions and/or shell materials and/or core materials. TEMs of the same shape or of different shapes can be used in the processes. TEMs of the same dimensions or of different dimensions can be used in the processes. TEMs of the same shell materials or of different shell materials can be used in the processes. TEMs having the same core materials or having different core materials can be used in the processes.

In the process herein for synthesizing MS-TEMs, the TEMs are a shell-core structure, whereby the shell blows out at the condensation reaction temperatures. At those reaction temperatures, in one embodiment about 100° C., the core material expands, and the shell material softens, thereby causing significant increase in volume of the cells, for instance as noted above up to 60 times the original volume. In certain embodiments of the process herein the maximum temperature during synthesis does not exceed the characteristic maximum expansion temperature of the shell material of the selected TEMs, so that all or a portion of the TEMs used remain (in the expanded state) within the as-formed mesoporous silica and the shell does not degrade. The material is removed completely or almost completely at a subsequent calcining step.

The polymers are fine powder materials that are highly dispersed during the preparation. The volume occupied by the original TEMs material does not provide interstitial sites of a shape template that impact formation of the MS-TEMs as a replica shape. This is in contrast to use of solid particles such as spheres as a secondary templating agent. Processes using solid particles or spheres have a dual templating process, with the first aspect being the copolymer for SBA-15 to produce the SBA-15 particles and the solid particles that allow the SBA-15 to form around the particles. When the particles are removed by calcination the remaining SBA-15 have the inverse replica shape of the packing arrangement of the particles, that is, the SBA-15 forms and connects where the interstitial sites of the particles once were present. This is not the mechanism of the TEMs used herein.

In the present process, TEMs are used in the SBA-15 sol-gel synthesis process to alter the properties of the as-produced MS-TEMs. By synthesizing mesoporous silica in the presence of TEMs as described herein, the properties of the resulting mesoporous silica differ when compared with conventional SBA-15 synthesis processes that occur in the absence of such TEMs. The properties of the conventional SBA-15 and the MS-TEMs were characterized (as explained in more detail below) after the hydrolysis and condensation reactions and prior to calcining (the "uncalcined" or "as-made" material), and after calcining. As compared to conventional SBA-15 mesoporous silica, and as explained in the examples herein, the MS-TEMs material exhibits:

"worm-like" morphology;
decreased unit cell dimensions for uncalcined and calcined MS-TEMs;
reduced apparent bulk density in the calcined material;
a higher degree of silanol (Si—OH) formation due to a higher quantity of $Q^2+Q^3$ silica in the uncalcined material;

a lower or similar degree of $Q^2$ silica in the uncalcined material, for instance where the MS-TEMs has in the range of about 0.1-50, 5-50, 0.1-35 or 5-35% less $Q^2$ silica as compared to conventional SBA-15;

a higher degree of siloxane bridges (Si—O—Si) due to a higher quantity of $Q^3+Q^4$ silica in the calcined material, and hence increased stability/rigidity of the mesoporous silica framework, for instance where the MS-TEMs has in the range of about 0.1-5, 1-5, 0.1-4 or 1-4% more $Q^3+Q^4$ silica as compared to conventional SBA-15;

a higher degree of $Q^4$ silica in the calcined material;

a lower degree of $Q^2$ silica in the calcined material; and an increased percentage of silanol groups, which is a function of the $Q^2+Q^3$ silica, in the as-made material, for instance where the MS-TEMs has in the range of about 0.1-50, 5-50, 0.1-40 or 5-40% more silanol groups as compared to conventional SBA-15.

Silanol groups in mesoporous silica are commonly used to provide a site to graft additional functionality to the surface of the material post-synthesis. For example, function siloxanes groups X—Si(OCH$_3$)$_3$ can be used to:

i) alter the surface properties of the material, for example by making the surface more hydrophobic or hydrophilic, or ii) uptake additional functionality to create advanced functional materials, for example, uptake of magnetic nanoparticles for improved medical imaging such as magnetic resonance imaging, graft catalytic complexes for catalysis, immobilization of enzymes, and uptake of active pharmaceutical ingredients for controlled release of drugs.

At low concentrations surfactants exist as discrete entities, however, at higher concentrations (above the CMC) micelles are formed. The hydrophobic interactions in the system comprising the surfactant can alter the packing shape of the surfactants into spherical, prolate or cylindrical micelles, which can thereafter form thermodynamically stable two dimensional or three dimensional liquid crystalline phases of ordered mesostructures. The surfactant geometry influences the mesophase formed, from cubic to lamellar; the geometry of the conventional SBA-15 and the MS-TEMs are both hexagonal p6mm symmetry.

Aside from the addition of TEMs described herein, the sol-gel synthesis is similar to known processes, for example as mentioned in the background and described with respect to formulae (1) and (2). In general, a sol-gel synthesis process to realize mesoporous silica as described herein starts with a colloidal aqueous solution of a (i) silica source, (ii) an acid medium, and (iii) a surfactant as a soft template material to influence a silica mesoporous structure.

Surfactants used as the templates for large pore mesoporous silicas are copolymers, block copolymers or triblock copolymers, and are generally amphiphilic molecules. The amphiphilic molecules can be cationic, anionic, non-ionic and/or zwitterionic. In certain embodiments an effective surfactant comprises a non-ionic surfactant. In certain embodiments an effective surfactant comprises a triblock copolymer of ethylene oxide/propylene oxide/ethylene oxide. For example, a suitable triblock copolymer of ethylene oxide/propylene oxide/ethylene oxide has the general composition $EO_{20}PO_{70}EO_{20}$, and is commercially available under the tradename Pluronic P123 (BASF), and is useful for the synthesis of SBA-15.

The mesoporous silica formation including the surfactant is acid-catalyzed, for example to realize a pH level less than about 3, 2 or 1. As with conventional SBA-15 synthesis, in the process herein this is by the addition of an effective amount of hydrochloric acid (HCl), sulfuric acid ($H_2SO_4$), hydrobromic acid (HBr), phosphoric acid ($H_3PO_4$) or nitric acid ($HNO_3$); typically in reported SBA-15 synthesis methods the acid is HCl.

The silica source can comprise one or more of tetraethyl orthosilicate (TEOS), tetramethyl orthosilicate (TMOS), tetrapropyl orthosilicate (TPOS), tetrabutyl orthosilicate (TBOS) or sodium (meta)silicate.

In the process herein, the ratios of silica source the surfactant and water include those that are effective for producing SBA-15 mesoporous silica, including for example surfactant in the range of about 1-5, 1-3, 2-5, 2-3 or about 2.5 wt % of the total sol-gel composition. The acid source is added at an effective quantity to attain a pH level of less than or equal to about 3, 2 or 1. An effective of the TEMs are also added, for instance in the range of about 0.1-10, 0.1-5, 1-10 wt % based on the combined mass of the surfactant, the acid source, water and the silica source.

In the synthesis steps for producing MS-TEMs, the sequence of adding the components is described above, but can be varied. In certain embodiments, the surfactant, water and acid source are formed into a solution, the TEMs are added, and then the silica is added. In other embodiments, the surfactant, water, acid source and TEMs are formed into a suspension, and then the silica is added.

Suitable conditions for the mixing steps described herein to produce the acid aqueous mixture of silica, surfactant and TEMs are similar to those used in conventional SBA-15 synthesis, and can be, for instance, in the range of about 20-65 or 20-50° C., and at atmospheric pressure. The mixing time before silica addition is generally dependent on the time that it takes for the surfactant to dissolve, and thereafter the silica is added and mixed until fully dissolved and in certain embodiments mixed for an additional 0-24 or 0-4 hours after it is fully dissolved.

The hydrolysis reactions occur at temperature and pressure conditions similar to those used in conventional SBA-15 synthesis, for instance about 20-65 or 35-65° C. and at atmospheric or autogeneous pressure, and for a time period of about 10 minutes to 24 hours or 4-24 hours. Also, condensation reactions occur at temperature and pressure conditions similar to those used in conventional SBA-15 synthesis, for instance about 80-120, 90-120, 80-110 or 90-110° C. and at atmospheric or autogeneous pressure, and for a time period of about 1-4 or 1-2.5 days.

The temperature and pressure conditions, and residence time, for the washing and filtration steps to recover precipitate from the supernatant that is used for producing SBA-15 mesoporous silicas and the novel mesoporous silicas herein are in the range of about: 20-80° C., at atmospheric pressure or vacuum pressure (for instance, up to about 33, 135 or 160 millibars absolute), and can occur until the pH of the filtrate approaches 7. The wash can be, for example, using wash water at twice the volume of the sol-gel. The wash can be until foam (residual surfactant) is significantly reduced. Filtration is accomplished, for instance, using known techniques such as centrifugation, gravity, vacuum filtration, filter press, or rotary drums.

The temperature and time for calcination to produce MS-TEMs herein can be in the range of about: 215-750, 215-600 or 215-550° C., for about 4-24, 4-16, 8-24 or 8-16 hours, and a ramp rate of about 1-10 or 1-5° C. per minute. In certain embodiments the temperature is held at a level in the range of about 380-420° C. for about 4-24 hours prior to increasing the temperature further.

EXAMPLES

Comparative Example 1.59 g of Pluronic P123 (mw$_{av}$ 5750) was dissolved in 55.24 g water and 5.16 g HCl (37 wt. %) at 40° C. Once dissolved 3.3 g tetraethyl orthosilicate (99 wt. %) was added to the solution and the system was further stirred at 40° C. for 24 hours for the hydrolysis reaction to proceed. The molar ratio of these components can be expressed as:

$$1SiO_2:0.018P123:3.3HCl:208H_2O.$$

The mixture was transferred to a Teflon-lined autoclave and the system isolated. The mixture was subjected to a temperature of 100° C. for 48 hours for the condensation reaction to proceed. After the desired time the autoclave was cooled and the product filtered under vacuum before washing with water. The resulting powder was dried at 100° C. to yield the as-made product. The as-made product was calcined at 550° C. (1° C./min) for 8 hours to yield the calcined SBA-15 mesoporous silica material.

Example 1.61 g of Pluronic P123 (mw$_{av}$ 5750) was dissolved in 55.20 g water and 4.88 g HCl (37 wt. %) at 40° C. Once dissolved 2.02 g Expancel 053 DU40 thermoplastic spheres as the TEMs were added to the mixture and stirring was continued for 24 hours. 3.3 g tetraethyl orthosilicate (99 wt. %) was added to the solution and stirring was continued at 40° C. for 24 hours for the hydrolysis reaction to proceed.

Thereafter, the mixture was transferred to a Teflon-lined autoclave and the system isolated. The mixture was subjected to a temperature of 100° C. for 48 hours for the condensation reaction to proceed. After the desired time the autoclave was cooled and the product filtered under vacuum before washing with water. The resulting powder was dried at 100° C. to yield the as-made MS-TEMs material (also referred to herein as the uncalcined material). The as-made material was calcined at 550° C. (1° C./min) for 8 hours to yield the MS-TEMs material.

FIG. 1 shows the X-ray diffraction patterns of the calcined SBA-15 mesoporous silica material of the comparative example and the calcined mesoporous silica material of the Example synthesized in the presence of TEMs (the MS-TEMs). X-ray diffraction is carried out with an X-ray source of Cu Kα radiation (λ=1.5406 Å) and the graph is presented in a known format of scattering, the 2θ angles, on the x-axis, plotted against intensity, measured in arbitrary units, on the y-axis. Table 1 presents unit cell dimensions of the comparative and the novel SBA-15 materials. It is observed from FIG. 1 that the long-range order is maintained. Peaks in the X-ray diffraction patterns are observed. The materials are amorphous silica and do not show peaks related to the positioning of the atoms, as is the case with zeolites which are crystalline materials having exact repeating units of atoms and spaces. Because the pores in SBA-15 mesoporous silica and MS-TEMs are ordered, and have a repeating long-range order, the observed peaks in the X-ray diffraction patterns relate to the pore system rather than the atoms in the framework as is the case with crystalline material.

The SBA-15 synthesized in the presence of TEMs has its diffraction pattern shifted to higher 2θ angles as indicated in FIG. 1, which is indicative of smaller unit cell dimensions as indicated in Table 1.

TABLE 1

| Material | 2θ (°) | Interplanar spacing, $d_{10}$ (Å) | Unit cell, $a_{10}$ (Å)* |
|---|---|---|---|
| SBA-15 | 0.93 | 95 | 110 |
| MS-TESs | 0.97 | 91 | 105 |

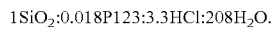
*Hexagonal lattice parameter; a = √(4/3) $d_{10}^2$.

Figure 2:
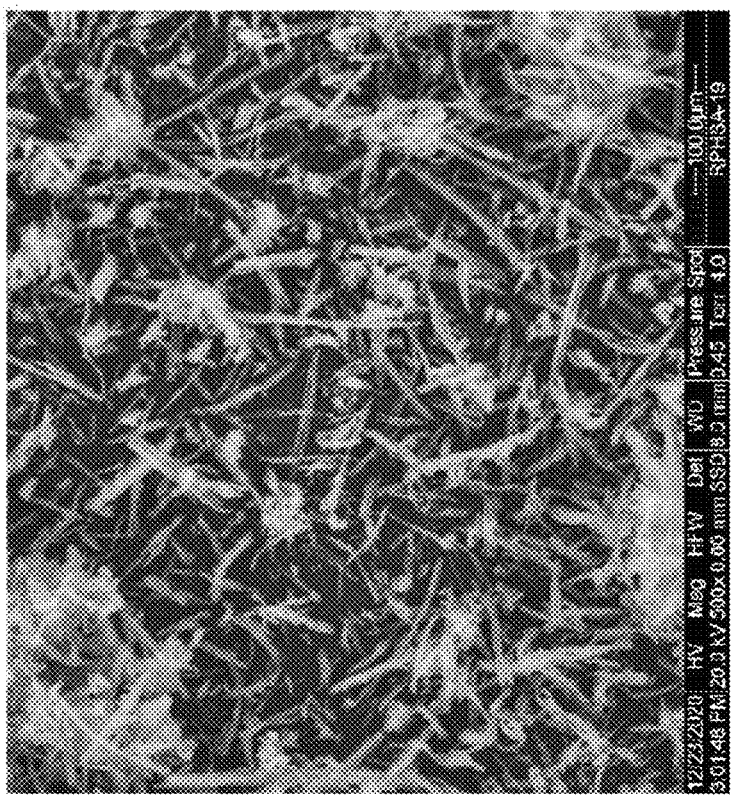
FIG. 2 shows scanning electron microscopy images of conventional SBA-15 and MS-TEMs.
Figure 2:
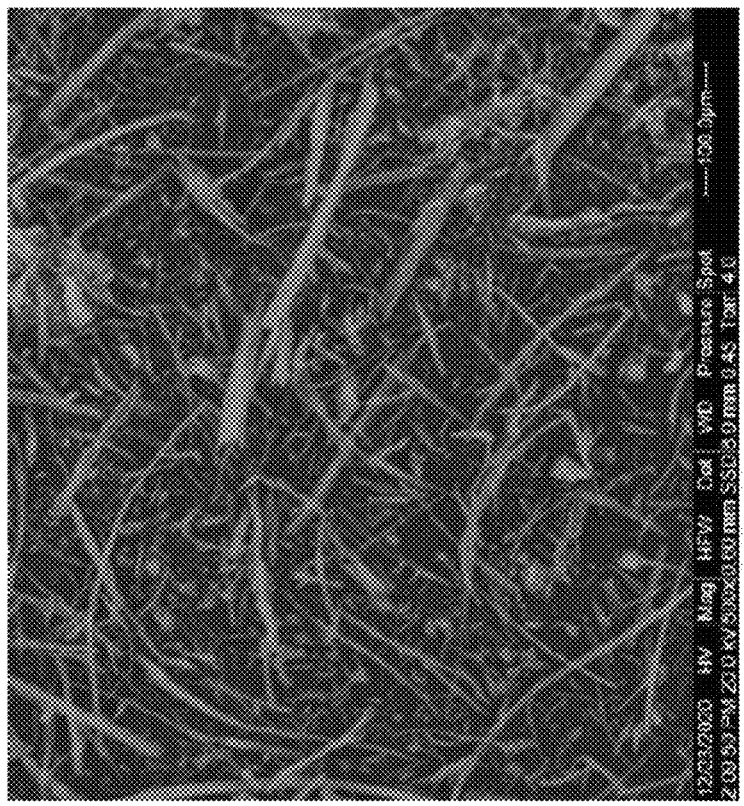

FIG. 2 presents scanning electron micrographs of conventional SBA-15 material and the MS-TEMs. Both show a worm-like morphology.

Figure 3:
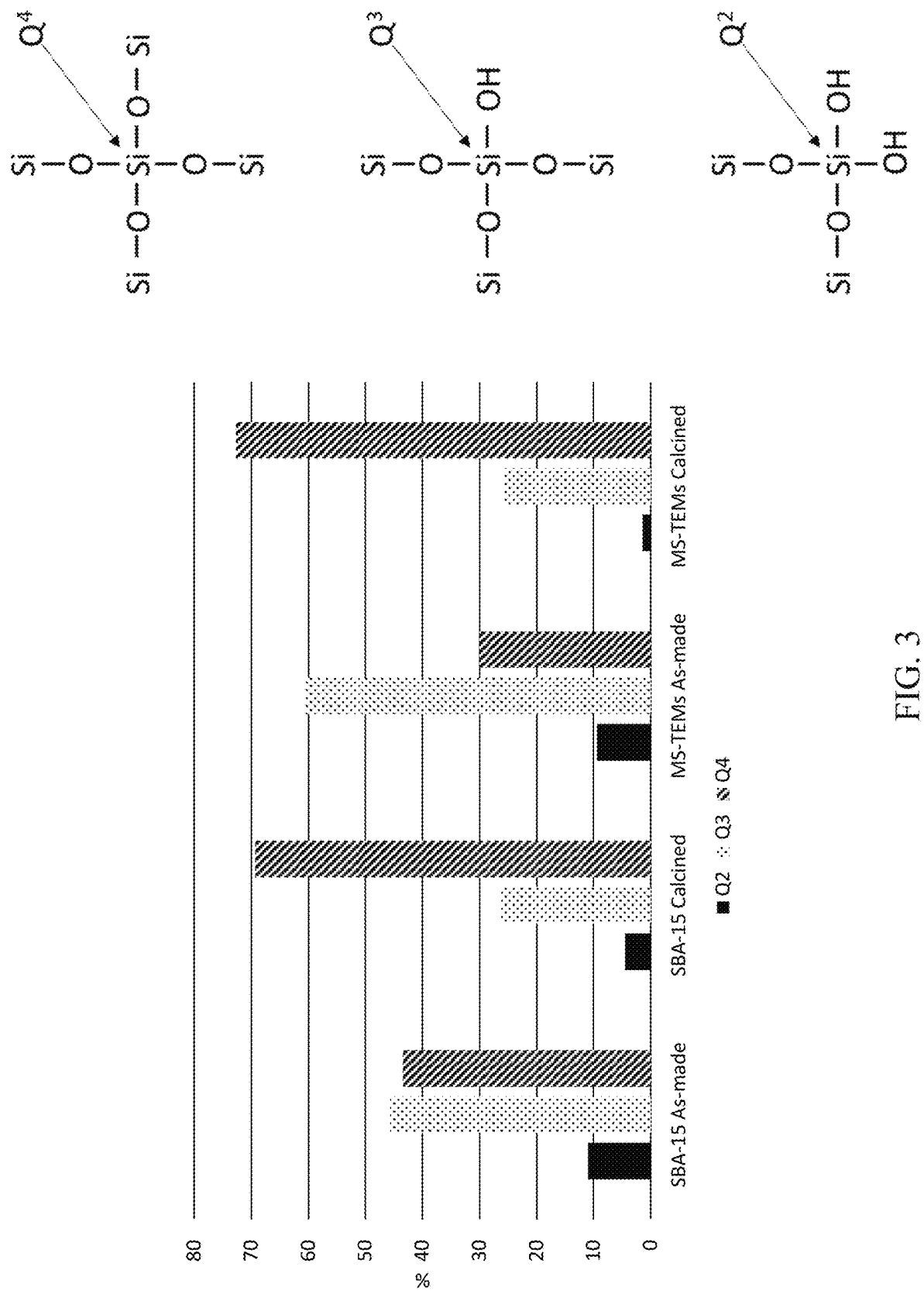
FIG. 3 is a graph of $Q^4$, $Q^3$ and $Q^2$ populations of conventional SBA-15 and MS-TEMs, determined from $^{29}Si$ nuclear magnetic resonance spectroscopy, and associated structural formulae of $Q^4$ siloxanes, $Q^3$ silanols and $Q^2$ silanols.

FIG. 3 shows $^{29}$Si NMR data and specifically the $Q^4$, $Q^3$ and $Q^2$ populations of conventional SBA-15 mesoporous silica material and MS-TEMs mesoporous silica material synthesized in the presence of TEMs. There are clear differences between the framework composition between the two samples. Samples were packed into 4 mm solid-state NMR sample rotors. Magic angle spinning (MAS) experiments were performed on a Varian 500 MHz NMR spectrometer using a 4 mm HX probe. $^{29}$Si MAS experiments were performed at a spinning frequency of 10 kHz. The obtained spectra were processed in MestreNova. Line fitting was performed on the spectra for peaks at approximate chemical shifts of −110 ppm ($Q^4$), −100 ppm ($Q^3$) and −90 ppm ($Q^2$). The area under the deconvoluted peaks were used to determine the percentage of $Q^n$ functionality present via the following equation:

$$\% \ Q^n = \text{Area under deconvoluted } Q^n \text{ peak/Area under all deconvoluted peaks} \quad (3)$$

When synthesized in the presence of TEMs, the uncalcined MS-TEMs material exhibits a 14% reduction in the amount of $Q^2$ silica, and an increase in the number of silanol groups (Si—OH) related to the $Q^2$ and $Q^3$ silica, up by 24%.

In the calcined MS-TEMs mesoporous silica material, there is an increase in the stability/rigidity of the framework due to the increased number of siloxane bridges (Si—O—Si) $Q^3$ and $Q^4$ (up by 3%).

Based on the nitrogen adsorption isotherm data, a BET surface area (based on the known BET (Brunauer, Emmett and Teller theory) of 806 m$^2$/g the MS-TEMs is close to that of the conventional SBA-15 (811 m$^2$/g). The percentage of microporous surface area to the total surface area is increased for MS-TEMs to about 18% (microporous surface area=143 m$^2$/g), whereas the percentage of microporous surface area to the total surface area for the conventional SBA-15 is about 13% (microporous surface area=103 m$^2$/g). The total pore volumes are similar in both cases (conventional SBA-15=1.07 cc/g; MS-TEMs=1.00 cc/g).

Additionally, for the MS-TEMs the volume occupied is approximately ⅓ larger for the same mass when compared with the "standard" SBA-15, which translates to an approximate reduction in the packing density by 27%.

Figure 4:
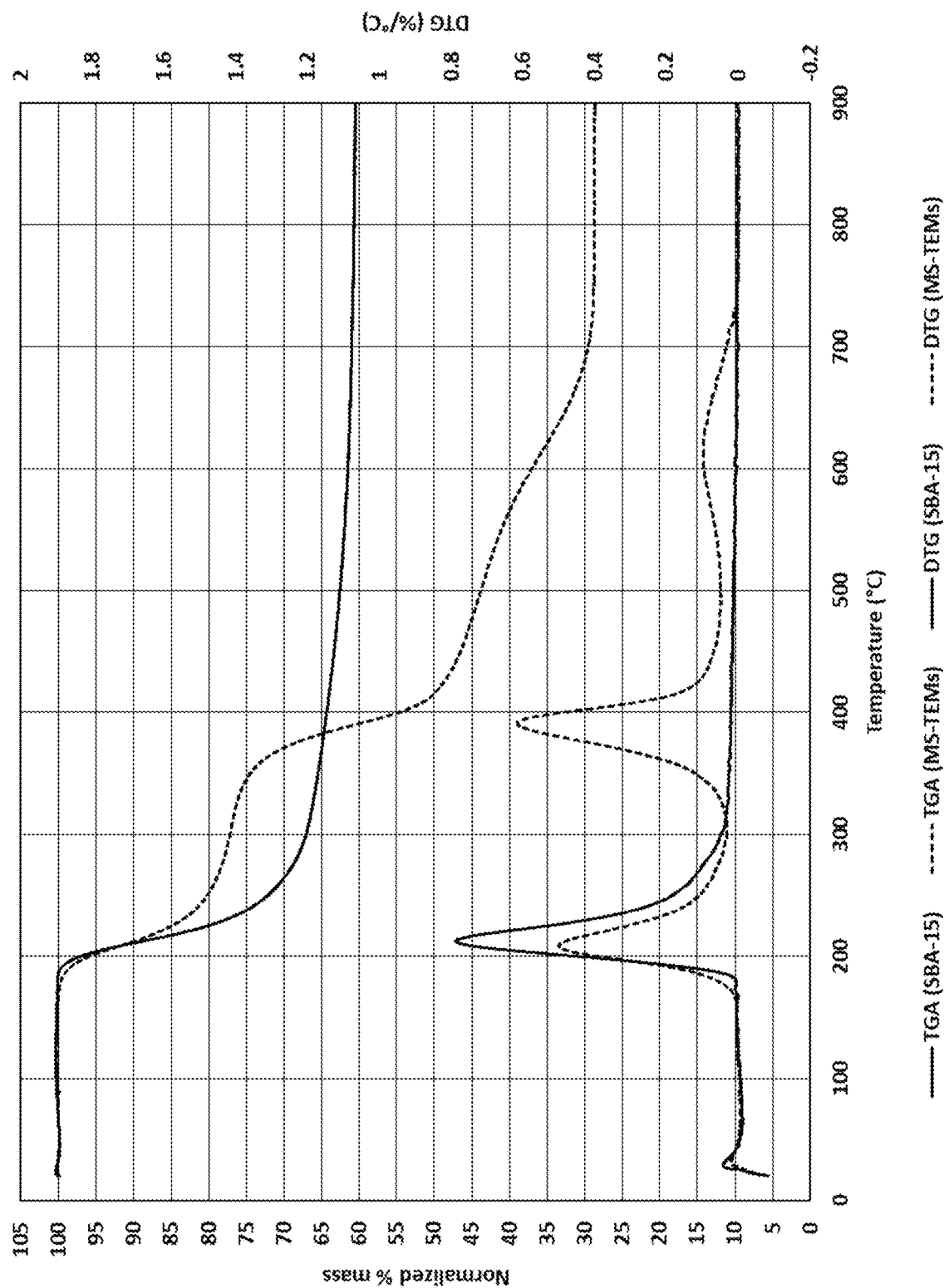
FIG. 4 presents graphs of thermogravimetric and differential thermogravimetric (DTG) data of conventional SBA-15 and MS-TEMs.

FIG. 4 are plots of thermogravimetric (TG) and differential thermogravimetric (DTG) conventional SBA-15 and MS-TEMs using a TGA Q500 instrument (TA Instruments). The TG data (upper curves in FIG. 4) are expressed as normalized percentage of mass change relative to temperature, and the DTG data (lower curves in FIG. 4) are expressed as mass % change relative to temperature.

The methods and compositions of the present invention have been described above and in the attached drawings; however, modifications will be apparent to those of ordinary skill in the art and the scope of protection for the invention is to be defined by the claims that follow.

The invention claimed is:

1. A method for the sol-gel synthesis of mesoporous silica having hexagonal p6mm symmetry, the method comprising:
   mixing in an acid aqueous medium under conditions conducive to promote hydrolysis reactions effective quantities of
   a surfactant as a soft template material to influence a silica mesoporous structure,
   thermally expandable microcells, and
   a silica source;
   heating the mixture under conditions and for a time effective conducive to promote condensation reactions and to form mesoporous silica as a precipitate suspended in a supernatant as an intermediate suspension; and
   recovering the mesoporous silica from the intermediate suspension.

2. The method of claim 1, wherein the aqueous medium is an acidic aqueous medium comprising hydrochloric acid as an acid component.

3. The method of claim 1, further comprising treating the mesoporous silica to remove surfactant, wherein treating comprises solvent extraction or thermal treatment.

4. The method as in claim 1, wherein the hydrolysis reactions occur at a temperature in the range of about 20-65° C., condensation reactions occur at a temperature in the range of about 80-120° C., and wherein removing surfactant is by thermal treatment at a temperature in the range of about 215-600° C.

5. The method of claim 1, wherein the thermally expandable microcells comprise a core containing low-boiling-point liquid hydrocarbon or oxygen-containing hydrocarbon within a thermoplastic shell, wherein the volumes the microcells increase about 5-60 fold under conditions of the condensation reactions.

6. The method of claim 5, wherein the thermoplastic shell comprises a polymer of acrylonitrile, vinylidene chloride, methyl methacrylate or combinations thereof.

7. The method of claim 5, wherein the core comprises paraffins with a carbon number between 4 and 8.

8. The method of claim 7, wherein the core comprises isobutane, isopentane, 2,2,4-trimethylpentane ($C_8H_{18}$) or combinations thereof.

9. The method of claim 5, wherein the core comprises an ether.

10. The method as in claim 1, wherein the silica source is selected from the group consisting of tetraethyl orthosilicate (TEOS), tetramethyl orthosilicate (TMOS), tetrapropyl orthosilicate (TPOS), tetrabutyl orthosilicate (TBOS) or sodium (meta) silicate.

11. The method as in claim 1, wherein the surfactant is a non-ionic surfactant.

12. The method as in claim 1, wherein the surfactant is a triblock copolymer of ethylene oxide/propylene oxide/ethylene oxide.

* * * * *